United States Patent Office 3,513,221
Patented May 19, 1970

3,513,221
CURABLE COMPOSITIONS CONTAINING EPOXY RESINS AND AMINE MODIFIED HYDROCARBON-ALDEHYDE RESINS
Ching Yun Huang, Minoo-shi, and Kazuo Ueno and Hisanori Tanabe, Ibaragi-shi, Japan, assignors to Japan Gas Chemical Company, Inc., Tokyo, Japan, a corporation of Japan
No Drawing. Filed July 10, 1967, Ser. No. 651,966
Claims priority, application Japan, July 21, 1966, 41/47,800
Int. Cl. C08g 45/06, 45/10
U.S. Cl. 260—830                                     5 Claims

ABSTRACT OF THE DISCLOSURE

Curable resin composition prepared by mixing an epoxy resin such as glycidyl polyether of polyhydric phenol with an amino modified aromatic hydrocarbon-aldehyde resin which is obtained by reacting an aromatic hydrocarbon-aldehyde resin with one or more of aliphatic amines and/or aromatic amines. As said hydrocarbon-aldehyde resin, for example, toluene formaldehyde resin, xylene formaldehyde resin, naphthalene acetaldehyde resin, etc. can be used. For example, diethylenetriamine, triethylenetetramine, hexamethylenediamine, etc. can be used as said aliphatic amine, and aniline, phenylene diamine, diaminodiphenylmethane as said aromatic amine. As said epoxy resin, for example, glycidyl polyether of polyhydric phenol, polyepoxy polyether, etc., obtained by reacting epichlorohydrin and polyhydric alcohol, are used. This cured resin is excellent in electric insulation, impact resistance, water resistance and chemical resistance compared with a cured resin of conventional epoxy resin-amine curing agent system.

---

This invention relates to a curable resin composition prepared by mixing an epoxy resin with a modified resin obtained by reacting an aromatic hydrocarbon aldehyde resin with one or more aliphatic amines and/or aromatic amines.

In general, an epoxy resin, in which an aliphatic or aromatic amine is used as curing agent, has excellent properties as molding materials, adhesives and coatings, on which a high value is set by the industries concerned. Compositions in which these curing agents are used, however, still have defects as the following. For instance, in the case of a composition in which an aliphatic amine is used, there are such defects as the aliphatic amine itself is injurious to a human body, that pot-life of the curable composition thereby produced is short, the calorific value of the heat generated in the curing reaction is low, and that chemical resistance and electric insulation of the cured product are inferior. On the other hand, in the case of a composition in which an aromatic amine is used, there are such defects as the aromatic amine itself has such a relatively high melting point that the preparatory operation of the curable composition thereof is difficult, and that in shaping the composition by means of a casting or the like, said composition is so highly viscous that the stirring results in difficulty. Further, the epoxy resin itself is so expensive that the uses thereof are considerably limited. Consequently, the further studies on reducing the costs of epoxy resin compositions are still in demand.

Recently, for the purpose of satisfying the above demand, for example, there has been made a proposal (Japanese Patent Publication No. 1481/62) which is directed to mixing a xylene formaldehyde resin with the conventional epoxy resin when the latter is cured using an amine as the curing agent. That is, it has been found that an attempt at the cost reduction of epoxy resin can be realized by mixing the so-called xylene formaldehyde resin which is obtained by reacting xylene with formaldehyde in the presence of an acid catalyst, with an epoxy resin-amine curing agent system. Also, it has been found further that pot-life of the composition can be prolonged, and excellent properties in adhesion or electric insulation, impact resistance or the like of the molded product can be obtained. The xylene formaldehyde resin, however, reacts with epoxy resin under acidic condition, but it hardly reacts with an epoxy resin under basic condition such as an epoxy resin-amine curing agent system. Accordingly, the hardness and thermal resistance of a cured product of epoxy resin are decreased in proportion to an increase in the amount of xylene formaldehyde resin added thereto. Particularly, in the case where a xylene formaldehyde resin of low viscosity is used, when 30% or more of xylene formaldehyde resin is added, the curing is incomplete, causing such defects as tackiness remaining on the surface of the cured product of epoxy resin, or the like. That is, a xylene formaldehyde resin is effective as a non-reactive diluent or plasticizer to an epoxy resin, but hardly effective as a curing agent. On this account, an amount of xylene formaldehyde resin to be added must be subject to restriction. In addition, in the above proposal, no improvement is made at all in the problem of toxicity of aliphatic amine.

On the one hand, it is well known that an aniline-formaldehyde resin, which is a high molecular curing agent, prepared by reacting aniline and formaldehyde, is cured by mixing with epoxy resin and heating to obtain a cured resin having a high heat distortion temperature. In the like manner as in the aforesaid aromatic amine as the curing agent aniline formaldehyde resin, however, has a relatively high melting point. On that account, in preparing the composition thereof, these resins are required to be mixed together with heating. Moreover, from the viewpoint of properties of the composition, it is necessary to add thereto a relatively large amount of the aniline formaldehyde resin. On this account, viscosity of the composition itself becomes high. Accordingly, it is necessary to reduce the viscosity by heating at each time of the fabrication operations for castings and solventless coatings. At the same time, heating of the composition results in the reduction of pot-life. For such reasons as above, the aniline formaldehyde resin-epoxy resin composition is not convenient in practical use.

The present inventors have carried out extensive studies with the purpose of obtaining an inexpensive curable composition without incurrence of a decline in properties of epoxy resin. As a result, they have unexpectedly succeeded not only in obtaining an excellent result exceeding the properties of the conventional cured product of epoxy resin by mixing an epoxy resin with an aromatic hydrocarbon aminoaldehyde resin obtained by reacting an aromatic hydrocarbon aldehyde resin with one or more of aliphatic amines and/or aromatic amines, and curing the resultant mixture, but also in removing the respective defects of the aforesaid ordinary curing agents for epoxy resin, xylene formaldehyde resin, and aniline formaldehyde resin mixed composition.

The cured resin obtained from the curable resin composition of the present invention is excellent in electric insulation, impact resistance, water resistance and chemical resistance, compared with a cured resin according to the conventional epoxy resin-amine curing agent composition. Moreover, the characteristics thereof reside in the point that a decrease in hardness and heat resistance, particularly in heat distortion temperature are not incurred in contrast to the case of a hardened resin in which a large amount of xylene formaldehyde resin has been merely mixed with an epoxy resin-amine curing agent composition. Furthermore, preparation of the present composition is readily carried out and at the same time the pot-life thereof is prolonged, because the aromatic hydrocarbon aldehyde resin in the present invention, which has been modified by an aliphatic amine and/or aromatic amine, is a resin which is liquid at room temperature or a resin having very low melting point. Still further, in the composition of the present invention, such adverse effects as cracking or the like on casting, which is attributable to heat generated, can be eliminated because of a low caloric value of the heat generated in the curing reaction. A further feature of great significance of the present composition is that there is no necessity to use such a toxic curing agent as aliphatic amine therein. In addition to the above features, the composition of the present invention is of great advantage in the fact that it can be obtained at a low price. That is, the conventional epoxy resin composition with which a xylene formaldehyde resin has been mixed is subject to a strict restriction in an amount of xylene formaldehyde resin to be added thereto from the viewpoint of properties as a cured resin. On the contrary, in the resin composition of the present invention a large amount of aromatic hydrocarbon aldehyde resin modified by amines can be mixed therewith, which results in a better mixing ratio of inexpensive aromatic hydrocarbon to the resin composition. Furthermore, an aromatic amine as the curing agent for epoxy resin is usually very expensive as in the case of phenylenediamine, while the relatively inexpensive aniline and the like could not be used on the ground of being monofunctional to an epoxy resin. In the case of the resin composition of the present invention, however, a cured resin can be obtained from an aromatic hydrocarbon amino aldehyde resin in which a monofunctional aromatic amine has been used as a raw material, whereby the reduction of cost can be effected without using an expensive curing agent for an epoxy resin.

The reason why the resin composition of the present invention has such excellent properties, is considered to be attributable to the fact that an aromatic hydrocarbonaldehyde resin is excellent in electric insulation, adhering property, water resistance and chemical resistance, and is bonded to an epoxy resin through amine. That is, the aromatic hydrocarbon-aldehyde resin obtained by reacting an aromatic hydrocarbon such as benzene, toluene, xylene and the like with an aldehyde such as formaldehyde, acetaldehyde and the like in the presence of an acid catalyst is generally in the form of liquid having a low viscosity or in the form of jelly having a high viscosity at room temperature. The structure thereof comprises an aromatic ring bonded with the groups represented by the formulas —CHR—, —CHROCHR— and —CHR(OCHR)$_n$OCHR—, and partially having a structure —CHROH at the terminal, wherein R represents a hydrogen atom or alkyl group. Among these bonds, oxygen-containing bonds other than bond represented by —CHR— have the property of being capable of reacting with an amino group or aromatic ring in the amine in the presence of the acid catalyst on heating. Accordingly, a resin prepared by reacting an aromatic hydrocarbonaldehyde resin with amines is an aromatic hydrocarbon-aminoaldehyde co-condensation resin in which the aromatic hydrocarbon and amine have been bonded together by —CHR— bond (this becomes methylene bond in the case of employing formaldehyde as aldehyde). This co-condensation resin has the primary, secondary and tertiary amines in the molecule, which are considered to bond to an epoxy resin.

As mentioned above, the aromatic hydrocarbonaminoaldehyde co-condensation resin used in the present invention can be obtained by reaction of an aromatic hydrocarbonaldehyde resin with amines. As the aromatic hydrocarbon aldehyde resin, there may be used a resin having a melting point of less than 30° C. and generally being liquid at room temperature, which is prepared by condensing with heat, in the presence of an acid catalyst, an aromatic hydrocarbon such as benzene, toluene, xylene, mesitylene, durene, styrene, naphthalene, methyl naphthalene, anthracene or the like, with an aliphatic aldehyde having less than 4 carbon atoms such as formaldehyde, acetaldehyde, propionaldehyde, butyraldehyde or the like. As the amines, there may be used an aliphatic amine such as ethylenediamine, hexamethylenediamine, diethylenetriamine, triethylenetetramine, tetraethylenepentamine, diethylaminopropylamine or the like, or an aromatic amine such as aniline, phenylenediamine, diaminodiphenylsulfone, xylenediamine, benzenetriamine, aminobenzenesulfonamide, benzenedisulfonamide, diaminodiphenyl, diaminodiphenylenethane or the like, or an anilineformaldehyde resin. Furthermore, a mixture of two or more of these amines can be used as well. When these amines and the aforesaid aromatic hydrocarbon-aldehyde resin are heated together, at a temperature of 100° C.–250° C. for 1–10 hours in the presence of 0.5–5% by weight based on the aromatic hydrocarbonaldehyde resin, of a catalyst, a liquid resin or resin having a melting point of less than 30° C. can be obtained. The catalyst may be an inorganic acid such as sulfuric acid, hydrochloric acid, phosphoric acid or the like, a Lewis acid such as zinc chloride, stannous chloride, aluminum chloride or the like, or organic sulfonic acid such as benzene sulfonic acid, paratoluenesulfonic acid, methoxylenesulfonic acid, or naphthalenesulfonic acid. That is, the resin hereby obtained is an aromatic hydrocarbon amino aldehyde resin such as toluene-diethylenetriamine-formaldehyde resin, toluene-aniline formaldehyde resin, xylene-hexamethylenediamine acetaldehyde resin, xylene-aniline butyraldehyde resin, durene - phenylenediamine formaldehyde resin, naphthalene-phenylenediamine acetaldehyde resin or the like.

In practicing the reaction of an aromatic hydrocarbon-aldehyde resin with amines, 100 parts of aromatic hydrocarbon aldehyde resin are reacted with 20–500 parts of amines based on the aromatic hydrocarbon aldehyde resin. In the case of reaction of an aromatic hydrocarbon aldehyde resin with amines, when the amount of amines is less than 20 parts, the degree of cure thereof upon an epoxy resin is reduced, which results in lowering physical properties, for example, such as the heat-resisting property. When an amount of amines above 500 parts is used, an abnormal prolongation of pot-life, improvements in chemical resistance, adhesive property and the like of cured product obtainable in the admixture with an epoxy resin, i.e. the features of the composition of the present invention cannot be exhibited.

Furthermore, as the epoxy resin used in the present invention, there may be mentioned glycidyl polyether of polyhydric phenol such as can be obtained by condensation of epichlorohydrin, which is generally called ethoxylin resin, with bisphenol (2,2'-bis-4'-hydroxyphenyl propane), polyepoxypolyether obtained by condensation of epichlorohydrin with polyhydric alcohol such as glycerol, propyleneglycol, pentaerythritol, trimethylol propane or the like, epoxy ester with polybasic acid such as diglycidylphthalate and diglycidyl adipate, polyepoxide having one or more of internal epoxy groups in the molecule such as vinylcyclohexene dioxide, cyclopentadiene oxide or the like, homopolymer of glycidylmethacrylate and copolymer of glycidylmethacrylate with acrylic monomer such as acrylic ester, methacrylic ester or the like, or vinyl monomer such as styrene, vinyl acetate, vinyl chloride or the like. When these epoxy resins are mixed with the aforesaid aromatic hydrocarbon aminoaldehyde resin and the mixture is cured, a material having from rigid hardness to flexible semi-hardness can be obtained.

The composition of the present invention, which consists of an aromatic hydrocarbon amino aldehyde resin and epoxy resin, uses the aromatic hydrocarbon amino aldehyde resin which is in the form of liquid at room temperature or has a low melting point. Accordingly, when employing a liquid epoxy resin, for example, such as "Epikote 828" or "Epikote 815" (a trade name of product produced by Shell Co.), the mixing operation is conducted with marked ease even in the case of solventless system. Epikote 828 is a liquid diglycidyl ether of bisphenol A having an epoxy equivalent weight of 185–192 and a viscosity in centipoises at 25° C. of 10,000–16,000. Epikote 815 is Epikote 828 diluted with 11% butyl glycidyl ether and has an epoxy equivalent weight of 175–195 and a viscosity in centipoises at 25° C. of 500–700. It is not necessary at all to employ heating in the mixing step in contrast to the case of a mixture of conventional curing agent of the aromatic amine system or aniline formaldehyde resin, and epoxy resin. Furthermore, there is no necessity to use as curing agent an aliphatic amine which has a strong toxicity. When the aforesaid epoxy resin is a solid, this is used after dissolving in solvent. As the solvent, there may be used a mixed solvent system of alcohol-ketone, ester-alcohol, and aromatic hydrocarbon-alcohol. As the alcohol, there may be used ethanol, propanol, butanol, as the ketone, such as methyl ethyl ketone, diethyl ketone, methyl isobutyl ketone or the like. As the aromatic hydrocarbon such as benzene, toluene, xylene or the like, and as the ester such as ethyl acetate, butyl acetate or the like.

The resin composition of the present invention can also be used together with a commercially available curing agent for epoxy resin. When an aliphatic amine is used as a commercial curing agent for epoxy resin, the curing in quickened. In that case, however, the pot-life is prolonged and the calorific value of heat generated in the curing step is low, compared with those of the conventional epoxy resin-aliphatic amine composition. When an excellent property is required in product composition, it is desirable to effect the curing with heat. The heating conditions comprising a heating temperature of 100°–200° C. and heating time of 1 to 10 hours can satisfy the requirements for various uses of the resin composition.

In the resin composition of the present invention, an optimum mixing ratio of the aromatic hydrocarbon amino aldehyde resin to epoxy resin is 50 to 400 parts by weight of epoxy resin per 100 parts of aromatic aminoaldehyde resin, but an amount of epoxy resin to be added can also be increased above the aforesaid range in case other commercially available curing agent for epoxy resin is used also.

As described hereinabove, the curable resin composition of the present invention possesses a number of features which cannot be seen in the conventional cured product of epoxy resin, and exhibits excellent properties in the field of applications such as molding materials, adhesives, coatings and so on.

EXAMPLE 1

A mixture of 100 parts of toluene formaldehyde resin (molecular weight: 310, and oxygen content: 8.2%), 100 parts of aniline and 2 parts of paratoluene sulfonic acid was allowed to react at 180° C. for 3 hours. Subsequently, unreacted aniline was removed by steam distillation and finally the resultant reaction product was subjected to vacuum dehydration. The thus obtained toluene aniline formaldehyde resin was a viscous liquid of brown color. With 300 parts of the resin, 200 parts of epoxy resin (Epikote 815) was admixed to obtain a resin composition. This composition was cast into a mold to allow standing for one night, then subjected to cure at 80° C. for 2 hours, and subsequently for additional 2 hours at 150° C. As a result of the comparison carried out on the property between the composition of the present composition and a cured resin obtained by subjecting the conventional composition, in which 15 parts of methaphenylene diamine has been added to 100 parts of epoxy resin, to the same treatment as above, the following values were obtained.

| | Composition of the present invention | Conventional composition |
|---|---|---|
| Heat distortion temperature (° C.) (ASTM D648-457) | 151 | 152 |
| Impact strength (Izod, ft.-lb./in.$^2$) | 0.81 | 0.49 |
| Volume resistivity (25° C. Ω cm.) | 3.1×10$^{17}$ | 2.5×10$^{16}$ |

EXAMPLE 2

A composition obtained by mixing 30 parts of toluene-aniline formaldehyde resin prepared in Example 1, 70 parts of epoxy resin (Epikote 828) and 4 parts of diethylenetriamine together, was coated on an iron plate. After allowing to stand for one week at 25° C., a film was formed thereon. Similarly, a film was prepared from a mixture of 100 parts of epoxy resin and 30 parts of curing agent for polyamide resin. Chemical resistance tests were conducted on these films to obtain the following results.

| | Composition of the present invention | Conventional composition |
|---|---|---|
| 10% caustic soda (immersion for 3 hr.) | No change | No change |
| 5% sulfuric acid (immersion for 3 hr.) | No change | Blisters |

EXAMPLE 3

To 100 parts of naphthalene-formaldehyde resin (molecular weight: 520, and oxygen content: 8.1%), were added 60 parts of diethylenetriamine sulfate and 3 parts of paratoluene sulfonic acid. The mixture was allowed to to react at 180° C. for 3 hours. The reaction product was dissolved in 200 parts of toluene, washed three times with a large amount of 20% aqueous caustic potassium solution and was rinsed with hot water several times. This toluene solution was subjected to steam distillation to remove the toluene therefrom and was then subjected to vacuum dehydration to obtain a viscous resin of brown color. A mixture of 50 parts of the above-obtained modified resin and 100 parts of epoxy resin (Epikote 825) was coated on the surface of aluminum plate and another aluminum plate was placed thereon to adhere thereto. Similarly, aluminum plates were adhered to each other with use of a composition prepared by mixing 100 parts of epoxy resin with 8 parts of diethylene triamine. The results of tensile shear strengths and pot-lives at 20° C. of the two compositions were as follows:

| | Composition of the present invention | Conventional composition |
|---|---|---|
| Tensile shear strength (20° C., kg./cm.$^2$) | 210 | 12.6 |
| Pot-life (min.) | 150 | 60 |

EXAMPLE 4

A mixture of 100 parts of xylene acetaldehyde resin, 100 parts of methaphenylene diamine and 2 parts of paratoluene sulfonic acid was allowed to react at 180° C. for 2 hours. 40 parts of the reaction product and 60 parts of epoxy resin (Epikote 815) were cast into a mold, and subjected to heat treatment at 85° C. for 2 hours and subsequently for additional 4 hours at 150° C. Separately, a mixture comprising 100 parts of epoxy resin with which 15 parts of methaphenylene diamine was mixed was treated in the same procedures as above. The two hardened resins were subjected to comparative test to obtain the following values.

|  | Composition of the present invention | Conventional composition |
|---|---|---|
| Heat distortion temperature (° C.) (ASTM D648-457) | 141 | 13.2 |
| Impact strength (Izod, ft.-lb./in.²) | 0.77 | 0.49 |
| Volume resistivity (Ω cm.): |  |  |
| 25° C. | $5.1 \times 10^{16}$ | $2.5 \times 10^{16}$ |
| 150° C. | $1.0 \times 10^{13}$ | $1.0 \times 10^{12}$ |

EXAMPLE 5

To 100 parts of naphthalene-formaldehyde resin (molecular weight: 520, and oxygen content: 8.1%), were added 30 parts of xylenediamine and 2 parts of methaxylene sulfonic acid. The mixture was allowed to react at 170° C. for 4 hours to obtain a liquid resin having a low viscosity at room temperature. A composition comprising 100 parts of the above resin with which 100 parts of epoxy resin (Epikote 815) and 8 parts of diethylenetriamine were mixed, was allowed to stand at room temperature for one night to obtain a hardened resin having a high surface hardness. By contrast, a composition prepared by mixing 100 parts of naphthalene formaldehyde resin, 100 parts of epoxy resin and 8 parts of diethylene triamine together still had a surface tackiness even after allowing to stand for 2 days.

EXAMPLE 6

To 100 parts of naphthalene acetaldehyde resin (molecular weight: 610, and oxygen content: 6.9%), were added 100 parts of diaminodiphenylmethane and 1.5 parts of methaxylene sulfonic acid. The mixture was allowed to react at 180° C. for 5 hours. To 80 parts of the reaction product, was added 100 parts of epoxy resin (Epikote 828), then the mixture was cast into a mold, and was subjected to heat treatment at 100° C. for 1 hour and subsequently for additional 1 hour at 150° C. The obtained cast article had a heat distortion temperature of 156° C. and an Izod impact strength of 0.93 ft.-lb./in.²

EXAMPLE 7

Various kinds of amines were allowed to react with 100 parts of xylene formaldehyde resin (molecular weight: 380, and oxygen content: 10.7%). A xyleneamino formaldehyde resin obtained by removing the used acid catalyst and free amine, was mixed with epoxy resin. Tensile shear strengths of the steel plates adhered to each other by use of this resin composition and then subjected to heat treatment at 150° C. for 2 hours showed the following values.

| Kind of amine used | Amount of modified amine used (part) | Mixing ratio of epoxy resin modified resin | Tensile shear strength (kg./cm.²) |
|---|---|---|---|
| Triethylenetetramine | 50 | 1:1 | 185 |
| Hexamethylenediamine | 50 | 1:1 | 174 |
| Aniline | 100 | 2:3 | 162 |
| Phenylenediamine | 150 | 3:1 | 207 |
| Methylenedianiline | 120 | 1:1 | 151 |
| Benzendisulfonamide | 100 | 2:1 | 81 |

What is claimed is:

1. A curable resin composition consisting essentially of a mixture of (1) 100 parts by weight of an amine-modified aromatic hydrocarbon-formaldehyde resin prepared by reacting 100 parts by weight of an aromatic hydrocarbon-formaldehyde resin obtained by condensing an aromatic hydrocarbon selected from the group consisting of benzene, toluene, xylene, mesitylene, durene, styrene, naphthalene, methylnaphthalene and anthracene with an aliphatic aldehyde selected from the group consisting of formaldehyde, acetaldehyde, propionaldehyde and butyraldehyde, with 20 to 500 parts by weight of at least one amine selected from the group consisting of aniline, phenylenediamine, methylenedianiline, diaminodiphenylsulfone, xylenediamine, benzenetriamine, diaminodiphenyl, diaminodiphenylmethane, ethylenediamine, hexamethylenediamine, diethylenetriamine, triethylenetetramine, tetraethylenepentamine and diethylaminopropylamine in the presence of 0.5 to 5% by weight, based on the weight of the aromatic hydrocarbon-aldehyde resin, of an acid catalyst at a temperature of 100 to 250° C. for a period of 1 to 10 hours and (2) 50 to 200 parts by weight of an epoxy resin containing more than one epoxy group in the molecule.

2. A curable resin composition according to claim 1, wherein the amine is aniline.

3. A curable resin composition according to claim 1, wherein the amine is phenylenediamine.

4. A curable resin composition according to claim 1, wherein the amine is diaminodiphenylmethane.

5. A curable resin composition according to claim 1 wherein the catalyst is selected from the group consisting of sulfuric acid, hydrochloric acid, phosphoric acid, zinc chloride, tin chloride, benzene sulfonic acid, p-toluene sulfonic acid, m-xylene sulfonic acid, and naphthalene sulfonic acid.

References Cited

UNITED STATES PATENTS

| 2,890,192 | 6/1959 | Spencer | 260—830 |
| 3,207,717 | 9/1965 | Maier | 260—28 |
| 3,301,918 | 1/1967 | Dereich | 260—829 |

FOREIGN PATENTS

| 3,574 | 4/1964 | Japan. |
| 1,441,885 | 5/1966 | France. |

SAMUEL H. BLECH, Primary Examiner

P. LIEBERMAN, Assistant Examiner

U.S. Cl. X.R.

260—67, 72, 72.5, 834